US010637873B2

(12) United States Patent
Kurian

(10) Patent No.: US 10,637,873 B2
(45) Date of Patent: *Apr. 28, 2020

(54) SMART INTERNET OF THINGS ("IOT") RELAY MONITORS

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/926,909

(22) Filed: Mar. 20, 2018

(65) Prior Publication Data

US 2019/0297093 A1 Sep. 26, 2019

(51) Int. Cl.
| | |
|---|---|
| G06F 11/00 | (2006.01) |
| H04L 29/06 | (2006.01) |
| H04W 4/70 | (2018.01) |
| G06F 12/14 | (2006.01) |
| H04W 88/16 | (2009.01) |

(52) U.S. Cl.
CPC ...... *H04L 63/1408* (2013.01); *H04L 63/1458* (2013.01); *H04L 63/1491* (2013.01); *H04W 4/70* (2018.02); *H04L 2463/141* (2013.01); *H04W 88/16* (2013.01)

(58) Field of Classification Search
CPC ............. H04L 63/1408; H04L 63/1458; H04L 63/1491; H04L 2463/141; H04L 63/1416; H04L 63/1425; H04L 63/1441; H04W 4/70; H04W 88/16

USPC ........................................................... 726/23
See application file for complete search history.

(56) References Cited

U.S. PATENT DOCUMENTS

| | | | | |
|---|---|---|---|---|
| 9,319,404 | B2 * | 4/2016 | Svigals | H04L 63/0861 |
| 9,485,231 | B1 * | 11/2016 | Reese | H04L 63/02 |
| 9,565,192 | B2 * | 2/2017 | Chillappa | H04L 63/102 |
| 9,591,016 | B1 * | 3/2017 | Palmieri | H04L 63/1433 |
| 9,699,659 | B2 * | 7/2017 | Zehavi | H04W 4/70 |
| 9,699,814 | B2 * | 7/2017 | Zakaria | H04W 4/70 |
| 9,716,595 | B1 * | 7/2017 | Kravitz | H04L 9/3268 |
| 9,729,528 | B2 * | 8/2017 | Zakaria | H04L 63/061 |

(Continued)

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Gary S Gracia
(74) *Attorney, Agent, or Firm* — Weiss & Arons LLP; Michael A. Springs, Esq.

(57) ABSTRACT

Apparatus and methods are provided for tracking and validating behavior and communication patterns of sensors on an Internet-of-Things ("IoT") network. Preferably, a tracking node is assigned to monitor activity of a target node. The tracking node may hand-off monitoring responsibility to another node on the network. A tracking node may intercept communications of a target node. A first tracking node may monitor activity of the target node in a first geographic location. A second tracking node may monitor activity of the target node in a second geographic location. Two or more tracking node may monitor activity of the target node in a geographic location.

19 Claims, 5 Drawing Sheets

(56) References Cited

U.S. PATENT DOCUMENTS

| | | | | |
|---|---|---|---|---|
| 9,825,921 | B2* | 11/2017 | Reese | H04L 63/02 |
| 9,875,510 | B1* | 1/2018 | Kasper | G06Q 40/12 |
| 10,251,053 | B1* | 4/2019 | Paczkowski | H04W 8/22 |
| 2016/0006753 | A1* | 1/2016 | McDaid | H04L 63/1425 |
| | | | | 726/23 |
| 2016/0173495 | A1* | 6/2016 | Joo | H04L 63/08 |
| | | | | 713/171 |
| 2016/0248746 | A1* | 8/2016 | James | H04W 4/70 |
| 2016/0259937 | A1* | 9/2016 | Ford | G06F 21/554 |
| 2016/0260095 | A1* | 9/2016 | Ford | G06Q 20/401 |
| 2016/0337127 | A1* | 11/2016 | Schultz | H04W 4/70 |
| 2016/0366181 | A1* | 12/2016 | Smith | H04L 63/102 |
| 2017/0163444 | A1* | 6/2017 | McLaughlin | H04L 69/08 |
| 2017/0223046 | A1* | 8/2017 | Singh | H04L 43/062 |
| 2017/0289184 | A1* | 10/2017 | C | H04L 63/1425 |
| 2018/0253451 | A1* | 9/2018 | Callan | H04L 9/3239 |
| 2019/0172566 | A1* | 6/2019 | Schulman | G16H 10/65 |
| 2019/0268370 | A1* | 8/2019 | Ogrinz | H04L 63/1416 |
| 2019/0289026 | A1* | 9/2019 | Kurian | H04L 63/1441 |
| 2019/0289454 | A1* | 9/2019 | Inoue | H04W 12/04071 |
| 2019/0349190 | A1* | 11/2019 | Smith | H04L 41/12 |

OTHER PUBLICATIONS

Warwick Ashford, "Global Hacker Botnet tops 6 million hijacked devices," http://www.computerweekly.com/news/450427023/Global-hacker-botnet-tops-6-million-hijacked-devices, Sep. 27, 2017.

* cited by examiner

SMART INTERNET OF THINGS ("IOT") RELAY MONITORS

FIELD OF TECHNOLOGY

This disclosure relates to a security framework that overcomes technical challenges for securing nodes on an Internet of Things ("IoT"). Specifically, this disclosure relates to a security framework for nodes connected to an IoT that do not, on their own, have sufficient hardware and/or software resources to implement security algorithms or protocols.

BACKGROUND

An IoT may be defined as "a pervasive and ubiquitous network which enables monitoring and control of the physical environment by collecting, processing, and analyzing the data generated by sensors or smart objects." Securing the Internet of Things: A Proposed Framework, Jazib Frahim, Carlos Pignataro, Jeff Apcar and Monique Morrow, Published by Cisco Security Research & Operations and available at: https://www.cisco.com/c/en/us/about/security-center/secure-iot-proposed-framework.html.

Examples of such sensors include refrigerators, lights, smartphones, smartwatches, computers, laptops, tablets, sinks, hot water heaters, coffee machines, ovens, vehicles, thermostats and any other suitable devices.

The diverse nature and large volume of data collected by numerous interconnected nodes on an IoT potentially enables unique functionality and operational opportunities.

Interconnected nodes may gather data. Computing systems may process the gathered data and derive new knowledge or insights from the gathered data. The new knowledge may be leveraged to provide feedback to the nodes or instructions to other nodes. Such feedback improves efficiency and intelligence of the nodes. Exemplary effects of improved efficiency and intelligence may be recognized by optimizing processes, improving understanding and targeting of customer needs, increasing automation and decreasing latency when providing products and/or services.

In an IoT, each of the connected nodes may not have uniform computing capabilities, known network positions, known communication protocols or sufficient resources to provide security services. Furthermore, IoT connected nodes may not be centrally controlled. Accordingly, it may be technically challenging to leverage IoT connected nodes for transmission of sensitive information or other applications that require a threshold level of security or performance. For example, sensitive information may include personally identifiable information or financial information that needs to be properly secured from third-parties. Furthermore, the unstructured nature of an IoT, poses a technical challenge to detecting a compromised IoT connected node.

To solve these technical challenges, it would be desireable to provide technical solutions that allow non-uniform and interconnected IoT nodes to function seamlessly and securely to thereby leverage the distributed efficiency and intelligence capabilities provided by an IoT to transmit sensitive information. Accordingly, it would be desireable to provide apparatus and methods for tracking and identifying secure IoT nodes and tracking and identifying IoT nodes that may compromise integrity of sensitive information transmitted via such a compromised node.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
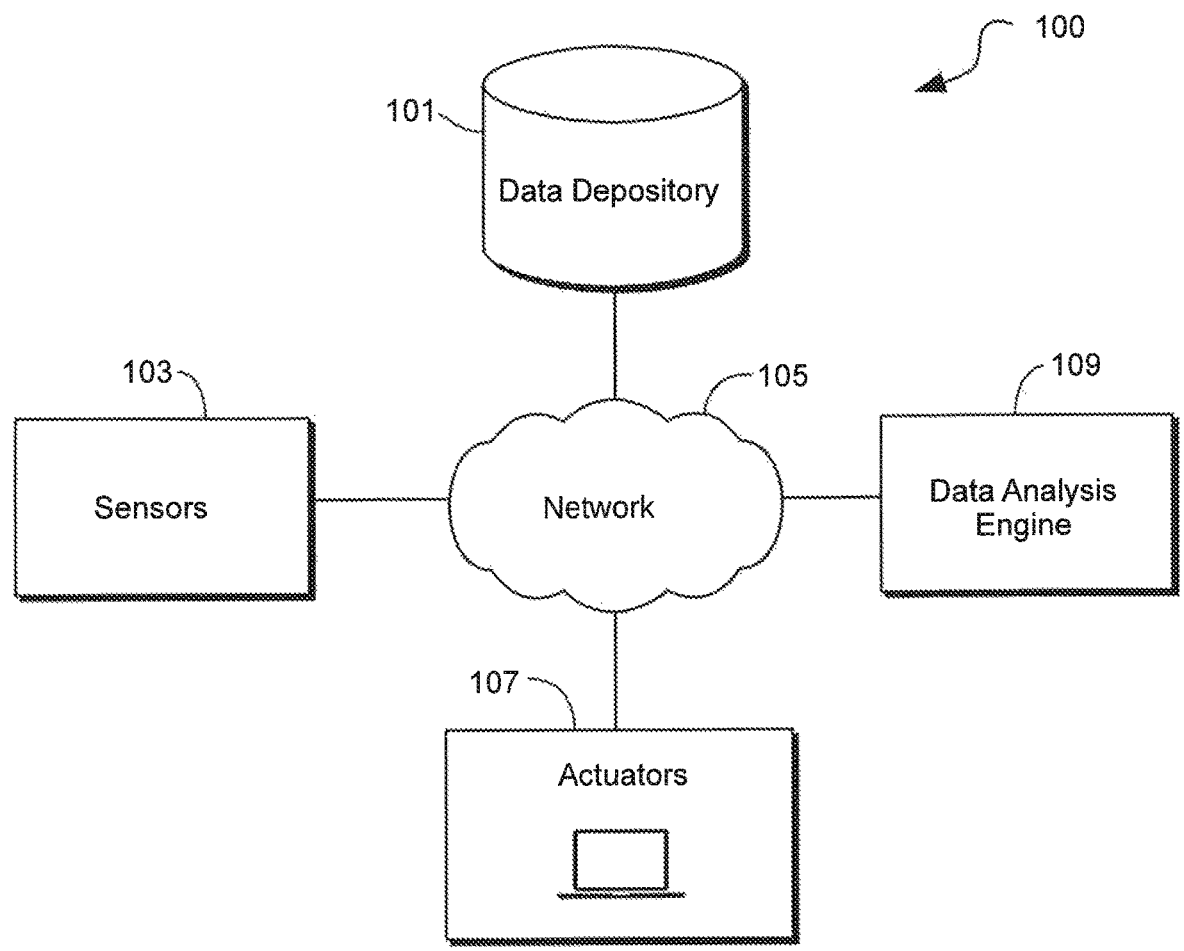
FIG. 1 shows an illustrative system architecture in accordance with principles of the disclosure.

Apparatus and methods for tracking activity of nodes on an Internet-of-Things ("IoT") are provided. Apparatus and methods for monitoring and/or intercepting communications of a target node on an unstructured and unsecured IoT are provided. Apparatus and methods for tracking and identifying secure IoT nodes and tracking and identifying IoT nodes that may compromise integrity of sensitive information transmitted via such a compromised node are provided.

Apparatus may include a network. The network may include a plurality of interconnected nodes. The network may include a target node. The target node may be placed under electronic surveillance. Electronic surveillance may include monitoring activity of the target node on the network.

The target node may be placed under electronic surveillance due to one or more actions taken by the target node. Action may include communication (e.g., instructions) transmitted by the target node. Action may include how the target node effects the physical environment. The target node may be placed under electronic surveillance due to exhibiting a malicious activity pattern.

Apparatus may include a first tracking node. The first tracking node may monitor machine-to-machine ("M2M") communications transmitted by the target node. The tracking node may monitor any suitable communication transmitted by, or activity carried out, by the target node. The tracking node may monitor an impact of the target node on its native environment. For example, the tracking node may be a sensor.

The tracking node may monitor the target node starting at a time the target node joins the network. The tracking node may monitor the target node because the target node has joined the network. The tracking node may monitor the target node until the target node crosses a checkpoint associated with the network. The checkpoint associated with the network may include a time or geographic location. The checkpoint may include an action taken by the target node. The checkpoint may include a communication received by another node on the network, or transmitted by the target node.

Apparatus may include a second tracking node. The second tracking node may monitor the target node. For example, the second target node may monitor M2M communications transmitted by the target node after the target node crosses the first checkpoint. Nodes on an IoT may be mobile (e.g., smartphone or automobile). When a node is within a first geographic region, activities (e.g., electronic communication or impact on a native environment) of the target node may be monitored by a first tracking node. When the target node is within a second geographic region, activities of the target sensor may be monitored by a second tracking node.

Monitoring activities of a target node may include relaying electronic communications, destined for or transmitted to the target node, to a central location. The central location may be a network gateway and/or computer server. The central location may identify patterns in the activity of a target node. The patterns may correspond to expected and benign activity of the target node. The patterns may correspond to malicious activity patterns.

A malicious activity pattern may include transmitting/receiving information associated with a known computer virus. A malicious activity pattern may include transmitting/receiving communications that deviate from historical communication patterns or physical effects associated with a node. A malicious activity pattern may include transmitting/receiving instructions and/or information that deviates from a scope of expected activity or expected functionality of a node.

A malicious activity pattern may include a node issuing instructions to a threshold number of other nodes on the network to act in concert within a pre-determined time window. "Acting in concert" may include instructing nodes to take action collectively or individually within a pre-determined time window and/or for a pre-determined amount of time. Such instructions may be suggestive of a denial-of-service type attack or other activity designed to disrupt a flow of information on a network. Instructions issued to a threshold number of nodes on the network to act in concert may correspond to a distributed denial of service attack on an IoT network.

A malicious activity pattern may include a multi-prong attack on one or more network nodes. Such an attack may include a target node initiating an attack of multiple nodes along a communication pathway.

In some embodiments, apparatus and methods may provide decentralized monitoring or tracking of the target node. In such embodiments, a tracking node may monitor activity of a target node and identify activity patterns exhibited by the target node.

Monitoring a target node may include tracking an average number of nodes on the network that retransmit a message (e.g., M2M communications) originated by the target node. A tracking node may track such retransmissions until the message originated by the target node reaches an intended destination node. A tracking node may request that any node that receives a message originating from the target node relay a copy of the message to the tracking node. The tracking node or other nodes on the network, such as a network gateway, may configure nodes to relay such messages.

For example, the network gateway may assign each node on the network a compound network address. The compound network address may provide an identifier for a node. The compound network address may identify an address of a tracking node. The compound network address may identify an address of a target node. In response to receiving a compound network address, a node may relay copies to the tracking node of messages received from and/or transmitted to the target node.

Monitoring the target node may include tracking messages transmitted by the target node until the message reaches an intended destination node. For example, the monitoring may log each node on the network that relayed the message until the message reached its final destination. Monitoring messages transmitted by the target node may include a tracking node receiving electronic acknowledgment from one or more nodes on the network associated with a sub-set of network addresses. The tracking node may instruct the one or more nodes to only transmit an electronic acknowledgment when a message is transmitted to, or received from, the target node.

A first tracking node may be configured to track communications transmitted by the target node and destined for a first sub-set of network addresses. A second tracking node may be configured to track communications transmitted by the target node and destined for a second sub-set of network addresses.

The tracking node may request that one or more other nodes on the network provide assistance in monitoring activity of a target node. For example, the tracking node may submit intercepted communications to a node that includes more powerful hardware or software resources to analyze the intercepted communications. If a tracking node detects that a target node is transmitting large volumes of data, the tracking node may commission additional tracking nodes to monitor activity of the target node.

The tracking node may hand-off or delegate responsibility for tracking the target to one or more other nodes on the network. For example, when a target node is within a pre-determined distance of a first network checkpoint, a first tracking node may hand-off electronic surveillance of the target node to a second tracking node.

In response to the first or second tracking node detecting activity of the target node that corresponds to a malicious activity pattern, the tracking node may initiate preventive and/or remedial action. For example, the tracking node may revoke an ability of the target node to initiate transmissions on the network. The tracking node may restrict transmission to/from the target node to predefined communication pathways. The tracking node may permit the target node to relay messages destined for other nodes. The tracking node may require that message transmitted by the target node be carried by nodes that have sufficient computing resources to scan the transmissions for computer viruses.

The tracking node may revoke a network identifier used to identify the target node on the network. The tracking node may request that the target node be assigned a network identifier that does not allow it to transmit executable instructions. The tracking node may prevent the target node from being issued a network identifier. Without a network identifier, the target node may be unable to transmit and/or receive messages using the network.

The tracking node may take remedial action in response to detecting malicious activity exhibited by a target node. Remedial action may include deploying counter-measures in response to malicious activity. For example, a tracking node may determine that the target node has initiated, or is likely to initiate, an attack on or more nodes that will disrupt functionality along a communication pathway provided by the one or more nodes. The tracking node may activate one or more alternate communication pathways. The alternate pathways may provide redundant communication pathways if functionality of the one or more is disrupted. An illustrative disruption may include a denial of service attack.

Remedial action may include configuring nodes along a communication pathway to power up and/or shutdown at specific times. The power-up/power-down cycling may make it more difficult for a target node to successfully implement an attack designed to disrupt functionality across a communication pathway. Nodes that are powered down may not be able to receive transmissions from a target node. Cycling nodes on or off may thwart an attempt to instruct a threshold number of nodes to act in concert. Cycling nodes on/off may thwart an attempt by the target node to coopt one or more nodes to take a specific action at a specific time. Cycling nodes on/off may thwart an attempt by the target node to launch a coordinated attack against multiple nodes.

A tracking node may reconfigure nodes along a communication pathway associated with a message. For example, nodes on the network may typically attempt to deliver messages to a destination using the least number, or less than a threshold number, of nodes. Based on the originating and destination nodes, such a transmission optimization algorithm may define a fixed number of possible communication pathways for a message. A tracking node may reconfigure nodes to power-up/power-down at random times. The power-on/power-off cycling may force the transmission optimization algorithm to alternate nodes that are selected to relay messages to a destination.

For example, the power-on/power-off cycling may reconfigure communication pathways such that a node does not relay more than two messages within a predetermined time window. Such a scheme may not be limited to relay of messages originating from the target node. A presence of a designated target node may trigger a tracking node to deploy such power scheme for one or more nodes on the network.

The first and second tracking nodes may monitor communications transmitted by the target node without the target node detecting that the first and second tracking nodes are monitoring such communications. For example, when the target node joins the network, the target node may be configured such that any message transmitted by the target node is relayed to a tracking node.

Apparatus may include a network gateway. The network gateway may be a computer server. When a target node joins the network, the network gateway may commission the first and second tracking nodes as destination network addresses for communications transmitted by the target node. For example, the network gateway may assign a network address or other identifier that requires the target node to copy a tracking node on messages it transmits. The network gateway may configure other nodes on the network to send copies of messages received from the target node to a tracking node. The network gateway may configure other nodes such that they will not execute messages received directly or indirectly from the target node without obtaining approval from a tracking node.

A network may include a third, fourth, fifth or any suitable number of tracking nodes. Tracking nodes may be configured to commission additional tracking nodes. For example, a tracking node may determine that to adequately track activity of a target node, a plurality of tracking nodes is needed. A first tracking node may commission a second tracking node and the second tracking node may commission a third tracking node. Each tracking node may be assigned to monitor activity of the target node.

One or more tracking nodes may be configured to monitor activity of a target node within predetermined network boundaries. For example, a tracking node may monitor activity of a target node until the target node crosses a network checkpoint. A network checkpoint may be defined by time, geographic location, message type, threshold quantity of transmitted data or any suitable criteria.

Apparatus may include tracking more than one target node. A tracking node may simultaneously track two or more target nodes. A first tracking node may commission a second tracking node in response to detecting that a first target node transmitted a threshold level of data to a second target node. Transmission of the threshold level of data may flag the second target node as "a node of interest"—a node having a connection to the first target node. For example, the second target node may have been infected by the first target node or may be acting in concert with the first target node.

Methods for securing nodes on an IoT are provided. Each node on an IoT may not have sufficient hardware or software resources to implement a security protocol. Methods may include receiving, at a first network gateway, a request from a node to join the IoT network. The request to join the network may designate the requesting node as a target node.

In response to receiving the request, the first network gateway may assign the target node a compound network address. The compound network address may include an identifier of the target node on the network. The compound network address may include an identifier of a tracking node on the network. The network gateway may transmit the compound network address to the target node. The network gateway may transmit the compound network address to the tracking node. In response to receiving the compound network address, the target node may be configured to join the network.

The compound network address may be propagated to nodes on the network. Nodes on the IoT network that receive the compound network address may be configured to relay messages transmitted by the target node to the tracking node. Propagating a compound network address may include a node, such as a network gateway broadcasting the compound address to nodes on the network.

In response to receiving the compound network address, the target node may be configured to copy the tracking node (identified in the compound network address) on messages transmitted by the target node. For example, a node on the network that receives a message from the target node may be configured to identify the address of the tracking node based on the compound address of the target node. In some embodiments a server (e.g., a DNS server) that resolves network addresses may be configured to identify the tracking node in response to receiving a request from a target node to provide a destination network address.

A tracking node may begin monitoring messages transmitted by the target node in response to receiving a compound network address from a network gateway. The tracking node may, in response to receiving the compound network address, identify itself as the tracking node to other nodes on the network.

Methods may include using the tracking node, detecting messages transmitted by the target node that correspond to the target node instructing a threshold number of nodes on the network to act in concert. In response to detecting such a message, the target node may revoke transmission privileges of the target node on the network. Transmission privileges of the target node may be revoked for a defined period of time. Transmission privileges of the target node may be revoked indefinitely. Revoking transmission privileges may include preventing the target node from obtaining a network address. For example, the tracking node may add a physical or hardware address of the target node to a "blacklist" of devices that are banned from the network.

In some embodiments, the target node may be assigned a network address that limits an ability of the target node to transmit messages on the network. For example, the network address assigned to the target node may restrict communication of the target node to a sub-set of nodes. Each of the nodes in the sub-set may be configured to track the target node. Each of the nodes in the sub-set may be configured to track another one of the nodes in the sub-set. Each of the nodes in the sub-net may possess sufficient computing resources to thoroughly analyze messages transmitted by the target node. The nodes if the sub-net may determine whether messages received from the target node may be circulate to other node on the network. A sub-net may be defined based on a range of network addresses, hardware addresses or any suitable criteria.

A network gateway may be a first network gateway. The network may include two or more network gateways. Methods may include a second network gateway receiving a request from the target node to renew the compound network address. Addresses on the network may be leased to nodes and may expire after a predetermined time period. A network address may only be valid within a sub-net of the network. When a node attempts to transmit a message to a node outside the sub-set, the node may be required to obtain an updated network address.

Nodes may apply to renew a network address. In response to receiving a renew request from a target node, a second network gateway may assign the target node an updated compound network address.

The updated compound network address may include an updated identifier for the target node. The updated compound network address may include an identifier of a second tracking node on the network. The updated identifier may allow the target node to access nodes part of a second sub-net.

The network gateway may transmit the updated compound network address to the target node. The network gateway may transmit the updated compound network address to a first tracking node. The network gateway may transmit the updated compound network address to a second tracking node. In response to receiving the updated compound network address, the first tracking node may hand-off responsibility for monitoring the target node to the second tracking node. After the hand-off is completed, the target node may begin to copy the second tracking node on messages transmitted by the target node. When the second tracking node receives the updated compound network address, the second tracking node may begin monitoring activity of the target node.

Upon receiving a compound network address, a tracking node may identify itself as the tracking node and identify the network address of the target node. The tracking node may understand that it is being designated as a tracking based on a position of its network identifier within the compound network address. For example, if a node already has been assigned a network address, when that node receives a compound network address that includes the network address previously assigned to it, the node may understand that it is being commissioned as a tracking node.

A network identifier may identify a node as a trusted node. A target node may be a trusted node. A target node may be an untrusted node. Activity of an untrusted target node may be monitored more frequently than activity of a trusted target node. A compound network address may include information that classifies a target node as trusted or untrusted.

Methods for handing-off monitoring of a target node are provided. Methods may include a first tracking node updating a second tracking node on a status of messages transmitted by target node and monitored by the first tracking node. For example, the first tracking node may inform the second tracking node how long the target node has been on the network and whether the target node has exhibited any malicious activity.

Methods may include a first tracking node commissioning a second tracking node. The second tracking node may monitor activity of the target node. After the first tracking node commissions the second tracking, the first and second tracking nodes jointly monitor activity of the target node. The first tracking node may commission the second tracking node when the target node submits a request to renew a network address. A compound network address provided to the target node may include a network address of the first tracking node and a network address of the second tracking node.

A second tracking node may hand-off responsibility for monitoring activity of the target node to a first tracking node. The second tracking node may hand-off monitoring responsibly in response to the target node returning to a first network checkpoint.

Methods may include intercepting communications transmitted by a target node. The tracking node may perform the intercepting. The tracking node may configure another node on the network to perform the intercepting. Methods may include intercepting communications in response to detecting that the target node has issued instructions corresponding to a malicious activity pattern. An exemplary malicious activity pattern may include the target sensor issuing instructions to a threshold number of nodes on the network to act in concert.

Methods may include spoofing the target node with confirmation that messages transmitted by the target node have been successfully transmitted to an intended destination. An intended target may include a threshold number of nodes. Methods may include monitoring a response to the target node to the spoofed confirmations.

Apparatus for securing an IoT network are provided. The IoT network may include a plurality of interconnected nodes. One or more of the nodes on the IoT network may not have sufficient hardware and/or software resources to independently secure themselves against malicious activity initiated by another node on the IoT.

Apparatus may include a target node. The target node may be placed under electronic surveillance. The target node may be place under electronic surveillance starting at a time the target node joins the network until it can be established that the target node is trustworthy. The target node may establish trustworthiness by refraining from any malicious activity for a predetermined time period. The predetermined time period may be randomly selected. A randomly selected time period may reduce an ability of a target node to evade detection of malicious activity.

Apparatus may include a first tracking node that monitors activity of the target node when the target node is within a first geographic region. Apparatus may include a second tracking node that monitors activity of the target node after the target node exits the first geographic region and enters a second geographic region. A tracking node may monitor activity of the target node in one or more geographic locations. For example, a tracking node may monitor activity of the target node in first and second geographic locations.

When the target node is within a pre-determined distance of the second geographic region, the first tracking node may hand-off electronic surveillance of the target node to a second tracking node. The first and/or second tracking nodes may be configured to detect when a target node issues instructions to a threshold number of unsecured nodes on the network to act in concert. In response to detection of such instructions, the tracking nodes may configure one or more of the threshold number of unsecured nodes to spoof the target node. The tracking node may configure all nodes on the network to spoof the target node. Spoofing the target node may include providing the target node with confirmation that a message transmitted by the target node was successfully received (even though it was not) by one or more of nodes on the network.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with the illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Architecture 100 may represent an illustrative internet of things ("IoT") network. A differentiator between IoT and conventional networks may include a traffic profile. In an IoT, nodes may not have defined or known network positions, communication protocols or security services. Solutions that allow architecture 100 to function seamlessly and securely despite functional and operational differences among nodes are disclosed herein.

Architecture 100 may include one or more nodes. Each node may include two or more nodes. FIG. 1 shows exemplary nodes 101, 103, 105, 107 and 109. Architecture 100 includes sensors 103. Sensors 103 may include devices that detect changes in a physical or virtual environment. For example sensors may measure audio, rainfall, temperature, water levels or activity of other sensors. Sensors may measure electronic network traffic, electronic signals (e.g., input or output) or frequency of user logins within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental changes.

Sensors may implement two or more functions. For example, sensors may measure changes in their native (physical or virtual) environment, capture data corresponding to the measured changes and store/communicate the captured data. Sensors may be accessed by other sensors or other network nodes. Sensors may transmit captured data to another node. For example, sensors may broadcast captured data to two or more nodes.

Captured data may be transmitted using any suitable transmission method. For example, data captured by a sensor may be transmitted to a smartphone. Sensors may leverage a communication link provided by a smartphone to communicate captured data to other nodes.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag. Sensors may be identified by an Internet Protocol ("IP") address.

Data captured by a sensor may be transmitted by the sensor and processed far from the location where the data was captured. For example, captured data may be transmitted from one node to another node until the captured data reaches data repository 101.

Sensors may be positioned in, and capture data from, diverse locations. Locations may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of, or delivery to, a desired node.

For example, a location where data is captured may not have continuous, reliable network connectivity. Accordingly, captured data may be stored locally on the sensor until a network connection is available to transmit or broadcast the captured data to another node.

Sensors may be grouped. Sensors may be grouped based on physical proximity or based on the content (or expected content) of data captured by the sensor. Sensors may be grouped virtually. Other nodes, such as data analysis engine 109 may create and/or be included in such groups. In some embodiments, the captured data may be organized by data repository 101.

Contextually, captured data may provide information not only about the native (physical or virtual) environment surrounding a sensor, but capturing of data from multiple sensors may provide data that signifies occurrence an event. Detecting the occurrence of the event may trigger sensors to take responsive action.

For example, based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable (e.g., logical) operation.

A node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a node may be linked by a system bus, wirelessly or by other suitable interconnections. Node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Illustrative network connections may include a local area network ("LAN") and a wide area network ("WAN"), and may also include other networks. When used in a LAN networking environment, a node may be connected to the LAN through a network interface or adapter. A node may include a communication circuit. The communication circuit may include the network interface or adapter.

When used in a WAN networking environment, a node may include a modem, antenna or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a display, battery, speaker, and antennas. Network nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

A node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, executed by a processor. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that power one or more components of a node.

Sensors in architecture 100 or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, nodes of architecture 100 may be configured to operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity and/or quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a sensor may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a sensor may respond slowly if the sensor transmits a large amount of captured data. If transmitted all at once, the large amount of information transmitted by the sensor, together with other informational traffic traveling on a shared communication pathway, may be close to, or exceed bandwidth of the communication pathway. As a result, sensors may be unable to transmit time-sensitive captured date in a timely manner.

Data travelling within architecture 100 to/from nodes may be routed along multiple communication pathways until the transmitted information reaches a desired destination node (e.g., data analysis engine 109). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships may enhance access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" or "fog" of computing devices. On-device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. Actuators 107 may move (translate, rotate, etc.) physical objects or activate/deactivate functionalities of physical objects. For example, actuators 107 may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as "eyes" collecting information about their native environment. In contrast, actuators 107 act as "hands" implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators 107.

Generally, nodes on a network may interact and cooperate using one or more interaction paradigms. Exemplary interaction paradigms include client-server and peer-to-peer interactions. However, an IoT may not include express or clearly defined relationships between sensors and the devices that access data captured by the sensors. Therefore, traditional approaches for managing trust, security naming, discovery, or other traditional network services may not be applicable or available.

As a result of the disparate nature of sensors 103, a system architecture, such as architecture 100 incorporating sensors 103 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a sensor may communicate wirelessly for short periods of time. Utilizing this approach, one or more standard size single cell cylindrical dry battery batteries (e.g., AA size) may provide a node with requisite computing power and wireless communication for many months.

Communication protocols used by nodes (e.g., sensors or actuators) may not have, or may not be capable of having, security capabilities. A security layer or buffer may be implemented by nodes that receive or rely on data captured by unsecured sensors. Sensors or other nodes may be dynamically connected or disconnected from a group or architecture. A security layer or buffer may be modular and quickly scalable meet node growth/contraction requirements.

A physical layer may link nodes of architecture 100. The physical layer may provide communication pathways to move data between multiple sub-networks and nodes. Such communication pathways may be wired or wireless. Exemplary wireless communication pathways may include Bluetooth, Wi-Fi, 3G, 4G, 5G and any other suitable wired or wireless broadband standards.

Figure 2:
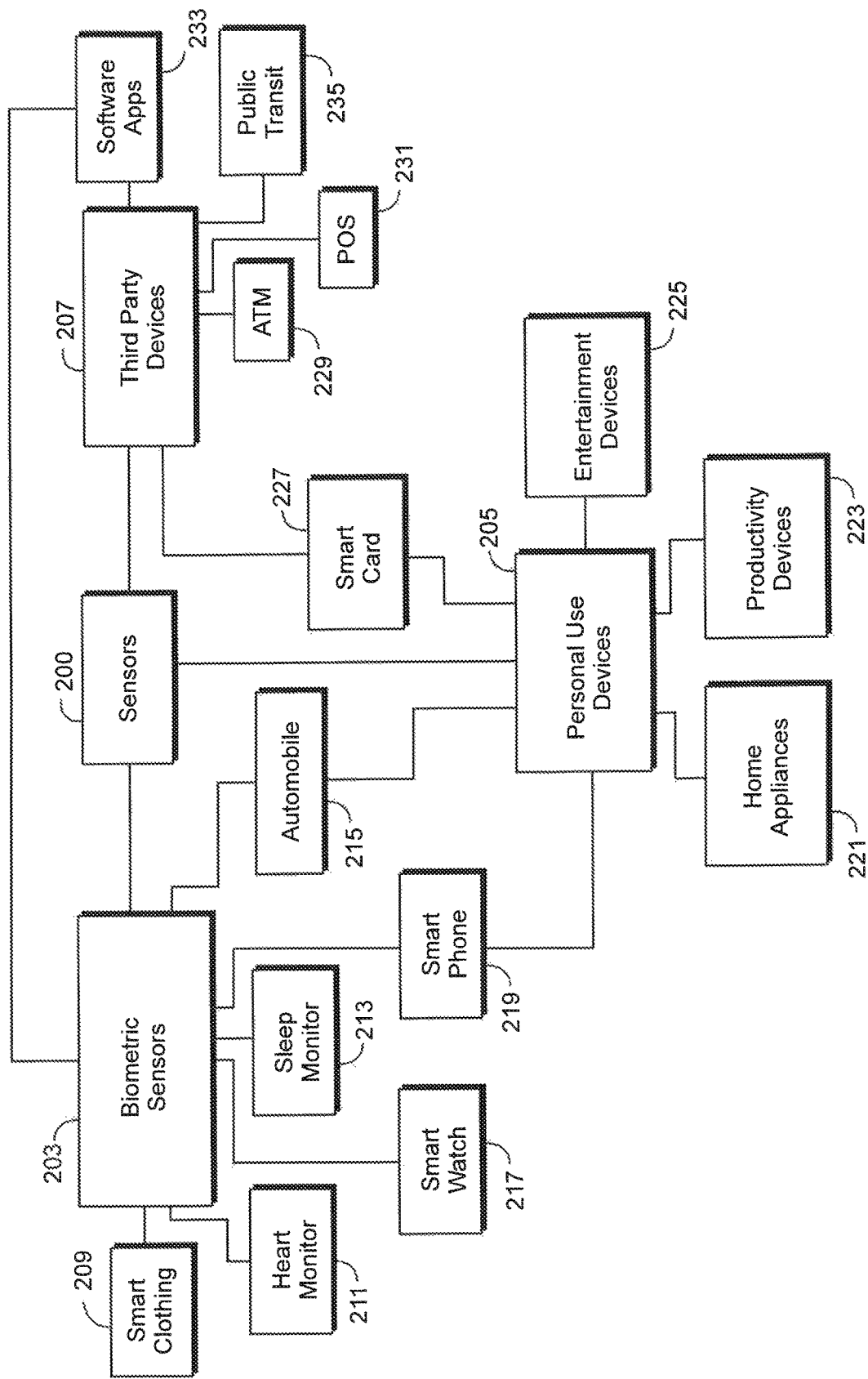
FIG. 2 shows an illustrative arrangement of interconnected nodes in accordance with principles of the disclosure.

FIG. 2 shows illustrative sensors 200. Sensors 200 may include or more features of sensors 103 (shown in FIG. 1). Sensors 200 include biometric sensors 203 that sense biometric attributes. For example, biometric sensors may be embedded in "smart" clothing 209 that monitor a wearer's physical condition. Such clothing may capture biometric data, such as pulse rate, temperature, perspiration levels, muscle contraction, heart rhythm and/or physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 217, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. Third-party devices may include devices whose use is monitored by a third-party. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Illustrative purchasing instruments may include a credit card, debit card and other electronic purchasing devices. Such purchasing instruments may sense a location or frequency of use.

Purchasing instruments may include "EMV" chips. EMV is a technology that derives its name from the companies (Europay, MasterCard, and Visa) that developed the technology standard. When a purchasing instrument and its associated EMV chip are inserted into a specialized card reader such as point-of-sale terminal ("POS") 231, the reader powers the EMV chip and the EMV chip generates a new authorization code each time the purchasing instrument is used. The EMV chip may capture transaction data such as transaction amount, transaction location or identity of the POS.

Third-party sensors 207 include ATM 229, POS 231 and public transit 235. ATM 229 and POS 231 may also be actuators. Third-party devices may also include software applications 233. Applications 233 may be used to access services, such as an online banking portal ("OLB"). Such applications may detect and validate biometric features submitted to gain access to an OLB. Third-party devices 207 may include sensors that capture data associated with power consumption (e.g., smart grids), electronic communication traffic, logistics (package movement) or any other suitable environmental condition.

FIG. 200 shows that sensors may categorically overlap. For example, software application 233 used to access an OLB may interact with biometric sensors 203 (e.g., fingerprint reader) to authenticate a user. Automobile 215 may be in regular communication with personal use devices 215 and biometric sensors 203.

Each of the sensors shown in FIG. 200 may include different and possibly incompatible hardware. For example, sensors may each have different operating systems (or none at all), processor types and memory requirements. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 micro watts ("µW") per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate and incompatible features of sensors 200, security solutions disclosed herein may be used to verify an authenticity of a sensor and/or data transmitted by the sensor.

Figure 3:
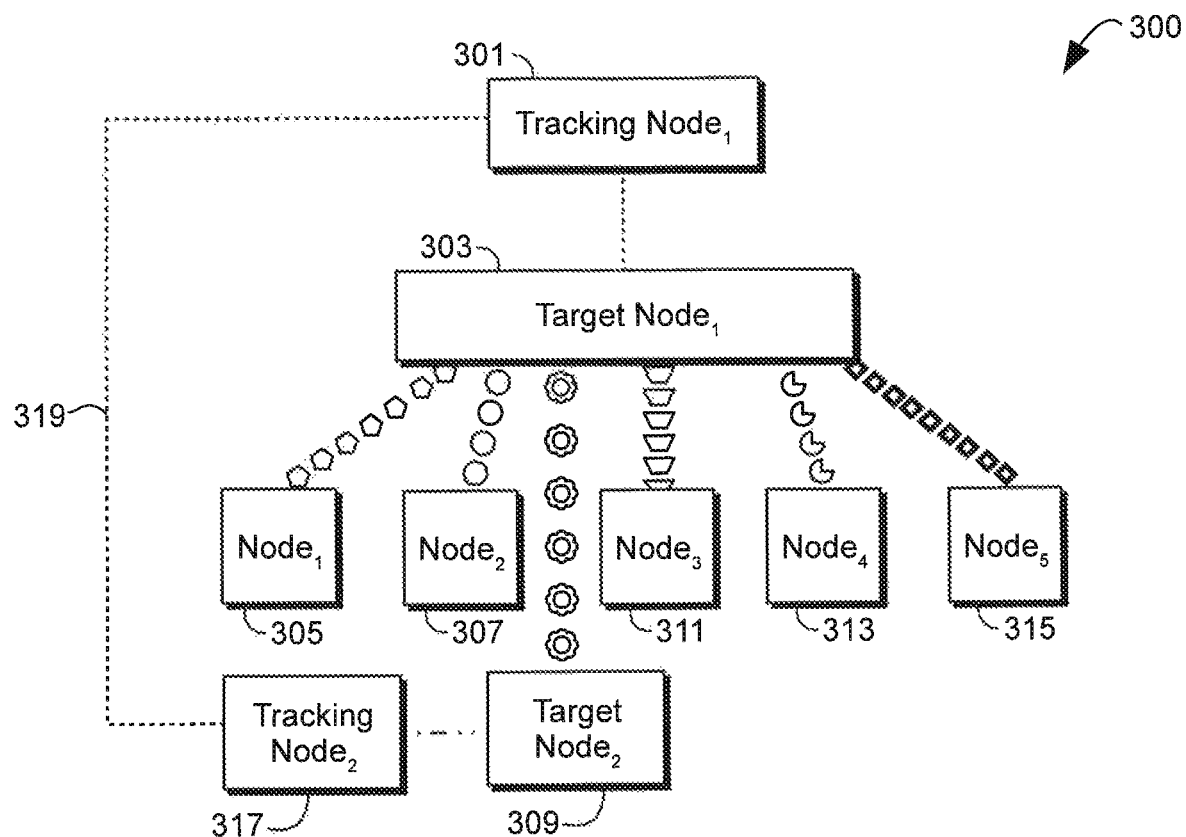
FIG. 3 shows an illustrative arrangement of interconnected nodes in accordance with principles of the disclosure.

FIG. 3 shows illustrative sensor arrangement 300. Arrangement 300 shows that tracking node 301 is assigned to monitor activity of target node 303. Arrangement 300 also shows that target node 303 communicates with nodes 305, 307, 309, 311, 313 and 315. Arrangement 300 shows that each of nodes 305, 307, 309, 311, 313 and 315 communicates with target node 303 using a specific communication pattern. In arrangement 300, communication patterns for each node are graphically represented by different shapes linking a node to target node 303.

Tracking node 301 may monitor activity of target node 303. For example, tracking node 301 may monitor whether target node 303 issues instructions to nodes 305-315 to act in concert within a pre-determined time-window. Such instructions issued by target node 303 may indicate malicious activity. In response to detection of such activity, tracking node 301 may take remedial or preventive action.

Arrangement 300 shows that activity of target node 309 is being directly monitored by tracking node 317. Tracking node 301 may indirectly monitor activity of node 309. Target node 317 may be designated for tracking based on a communication pattern between target node 309 and target node 303. Arrangement 300 shows that tracking nodes 303 and 317 may be aware and communicate with each other via communication pathway 319. Tracking nodes on a network may coordinate tracking of target nodes and may identify additional nodes that should be tracked. In some embodiments, two or more tracking node may monitor activity of one target node.

Figure 4:
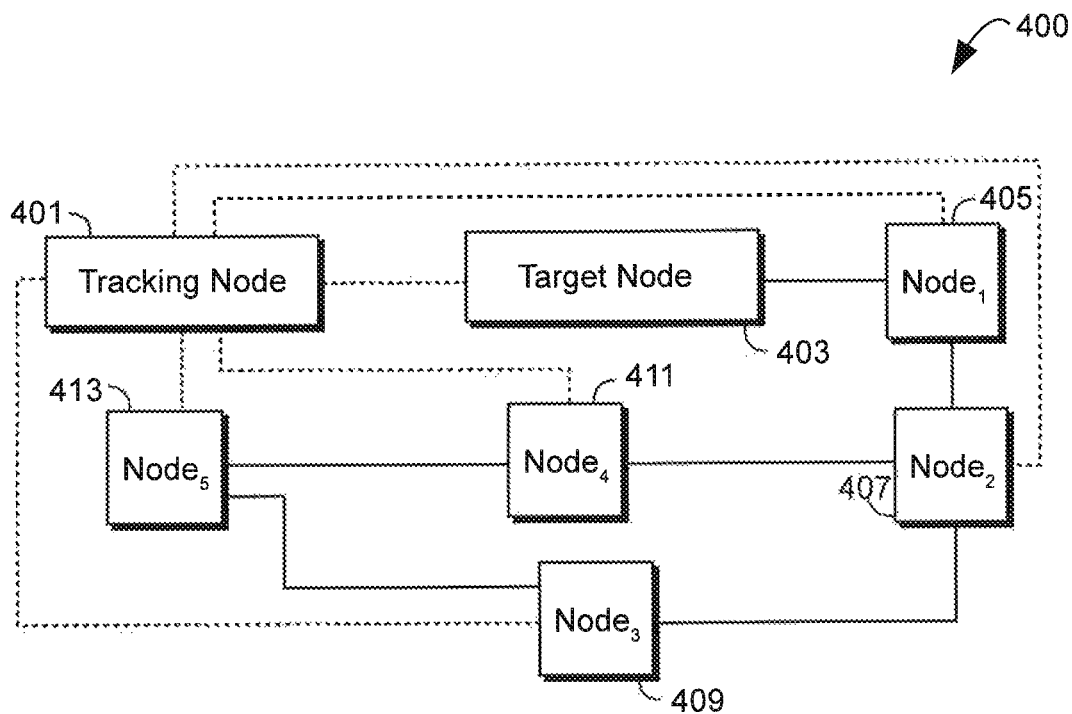
FIG. 4 shows an illustrative arrangement of interconnected nodes in accordance with principles of the disclosure.

FIG. 4 shows illustrative monitoring arrangement 400. Arrangement 400 includes tracking node 401. Tracking node 401 has been commissioned to monitor activity of target node 403. Arrangement 400 includes a direct communication pathway that links target node 403 to node 405. Arrangement 400 also includes communication pathways that link target node 403 to nodes 407, 409, 411 and 413. For example, target node 403 may communicate with node 413 via a communication pathway that includes nodes 405, 407 and 409.

Broken lines shown in FIG. 4 represent communication pathways linking a node to tracking node 401. Solid lines shown in FIG. 4 represent communication pathways that are utilized by target node 403. In some embodiments, target node 403 may not be provided access to, or be aware of, communication pathways shown in broken line.

Arrangement 400 shows that tracking node 401 monitors activity of nodes that are in direct and indirect communication with target node 403. Arrangement 400 shows that nodes in direct and indirect communication with target node 403 may each relay copies of messages received from, or destined for, target node 403. In some embodiments, nodes in direct and/or indirect communication with target node 403 may each relay acknowledgment to tracking node 401. An acknowledgement may confirm that a node has received a message from, or transmitted a message to, target node 403. After receiving the acknowledgement, tracking node 401 may decide whether to request a copy of the transmitted/received message.

Arrangement 400 shows that target node 403 has at least two possible communication pathways to reach node 413. Tracking node 401 may configure one or more of nodes 407, 409, 411 and 413 such that the same communication pathway is not consistently used by target node 403 to reach node 413. For example, tracking node 401 may instruct one or more of nodes 407, 409 and 411 to power-on or -off so that messages transmitted to/from target node 403 do not always use the same communication pathway. For example, when node 409 is powered off, to access node 413, target node 403 may be forced to use a communication pathway that includes nodes 405, 407 and 411.

Alternating communication pathways utilized by target node 403 may enhance monitoring of target node 403. Alternating communication pathways may increase a security of an IoT network by preventing a target node from configuring a threshold number of nodes to take action in concert. By alternating communication pathways, tracking node 401 may confirm that potentially malicious activity exhibited by target node 403 is being observed across both possible communication pathways before disconnecting target node 403, or taking other remedial action.

Alternating communication pathways may also be leveraged by tracking node 401 to mitigate potential damage to an IoT network in response to detecting malicious activity exhibited by target node 403. For example, in response to detecting malicious activity exhibited by target node 403 that may have infected node 411, tracking node 401 may configure nodes 405 and 407 to bypass node 411. Tracking node 401 may configure nodes 405 and 407 to communicate with node 413 via node 409 and bypass node 411.

Figure 5:
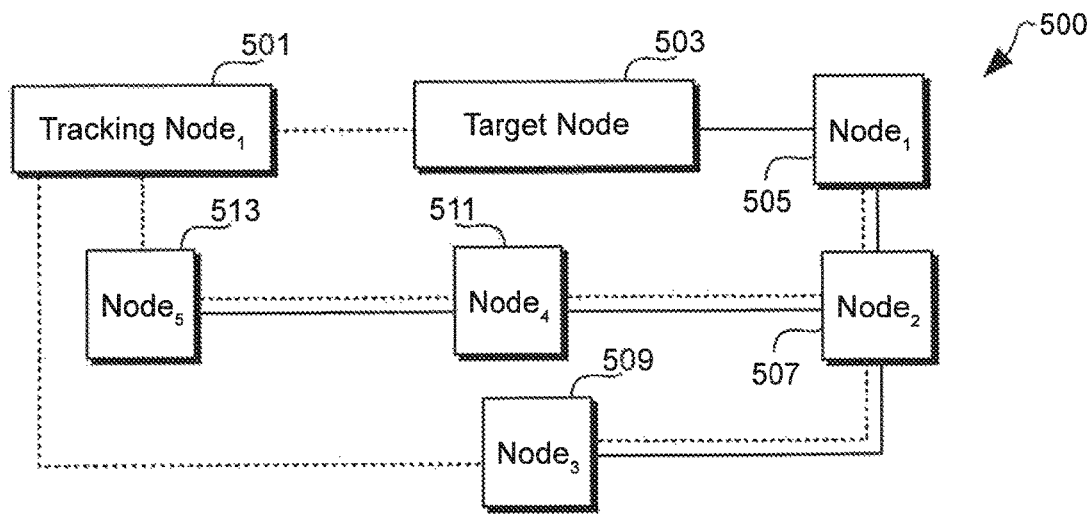
FIG. 5 shows an illustrative arrangement of interconnected nodes in accordance with principles of the disclosure.

FIG. 5 shows illustrative monitoring arrangement 500. Arrangement 500 includes tracking node 501. Tracking node 501 is configured to monitor activity of target node 503. Arrangement 500 includes nodes 505, 507, 509, 511 and 513. Nodes 505-513 receive and/or transmit messages, directly or indirectly, to target node 503.

Broken lines shown in FIG. 5 represent communication pathways linking tracking node 501 to other nodes. Communication pathways shown in broken line may be utilized by tracking node 501 to monitor activity of target node 503. Solid lines shown in FIG. 5 represent communication pathways that originate from target node 503 or are destined for target node 503.

Arrangement 500 shows that only nodes 513 and 509 are in direct communication with tracking node 501. Limiting a number of nodes in direct communication with tracking node may streamline a data gathering process implemented by tracking node 501. Communications transmitted to/from target node 503 to/from any of nodes 505-513 may be relayed to tracking node 501 via node 513 or via node 509. Tracking node 501 may configure nodes 505-513 to alternate whether data is provided to tracking node 501 via node 509 or via node 513. In some embodiments, tracking node 501 may receive data via both nodes 509 and 513.

To reduce an ability of target node 503 to detect that tracking node 501 is monitoring activity of target node 503, tracking node 501 may alternate which communication pathway (e.g., via node 509, node 513 or both) is utilized to communicate with tracking node 501.

Figure 6:
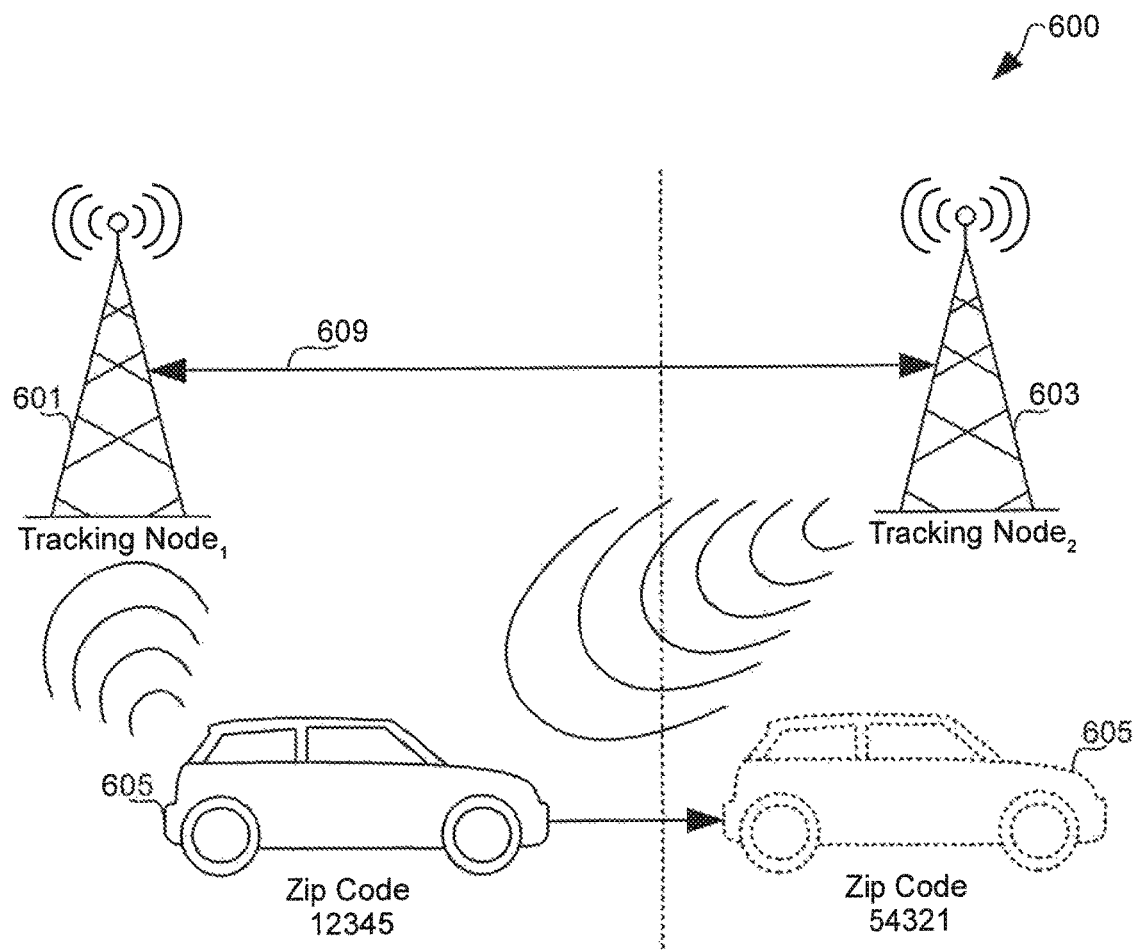
FIG. 6 shows an illustrative scenario in accordance with principles of the disclosure.

FIG. 6 shows illustrative scenario 600. In scenario 600, tracking node 601 is monitoring activity of target node 605. Tracking node 601 may be configured to monitor activity of target node 605 when target node 605 is within a predefined geographic location. For example, scenario 600 shows tracking node 601 monitoring target node 605 within an area defined by zip code 12345. As target node 605 gets closer to an edge of zip code 12345, tracking node 601 may initiate hand-off procedure 609. Hand-off procedure 609 may include tracking node 601 identifying tracking node 603. Tracking node 603 may be positioned in a geographic location that borders zip code 12345.

Tracking node 601 may identify two or more tracking nodes that are positioned in one or more geographic locations that border zip code 12345. In some embodiments, tracking node 601 may evaluate a projected trajectory of target node 605 and determine which geographic region is most likely to be penetrated by target node 605 after target node 605 exits zip code 12345. In some embodiments, tracking node 603 may initiate a hand-off procedure.

After target node 605 enters a specific geographic region, such as zip code 54321, tracking node 603 may begin monitoring target node 605. Tracking node 603 may broadcast a message to other tracking nodes informing them that it has taken control of monitoring target node 605.

Tracking node 603 may begin monitoring activity of target node 605 after or just before target node 605 leaves zip code 12345. Tracking node 603 may begin monitoring activity of target node 605 after or just before target node 605 enters zip code 54321. A border of zip code 12345 and 54321 may be a network checkpoint. In some embodiments, as target node 605 approaches the border of zip code 12345 and/or 54321, both tracking node 601 and 603 may monitor activity of target node 605.

Figure 7:
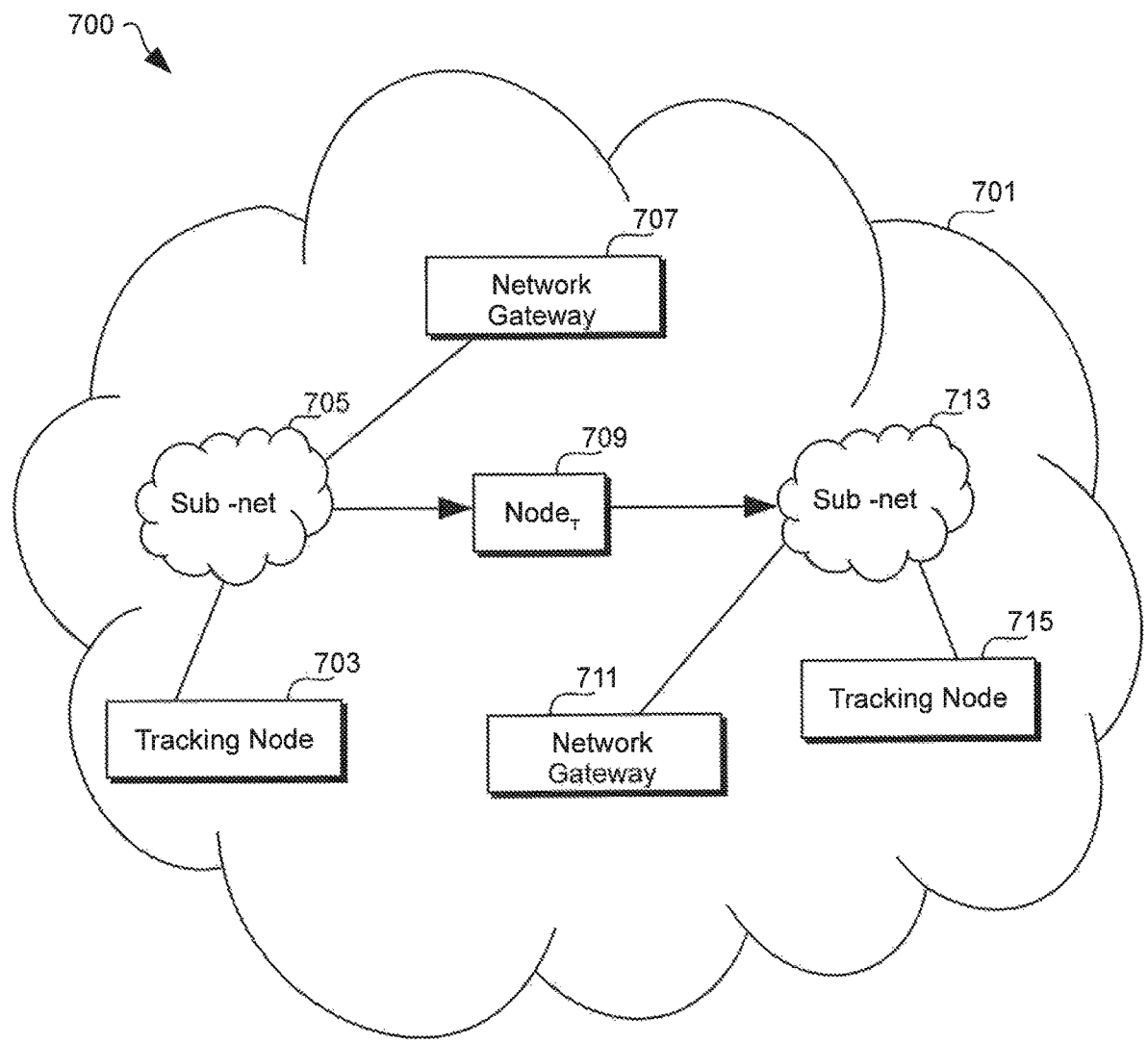
FIG. 7 shows an illustrative scenario in accordance with principles of the disclosure.

FIG. 7 shows illustrative scenario 700. Scenario 700 shows that tracking node 703 is assigned to monitor activity of target node 709 within sub-net 705. Sub-net 705 may be defined based on addresses provided to nodes within sub-net 705 by network gateway 707. Target node 709 may move (physically or virtually) within larger IoT network 701. For example, target node 709 may attempt to access resources that are within sub-net 713. To access resources within sub-net 713, target node 709 may submit a request to network gateway 711 asking to be assigned an address that provides access to sub-net 713.

Scenario 700 shows target node 709 moving from sub-net 705 to sub-net 713. To ensure that activity of target node 709 is continually monitored during the transition from sub-net 705 to sub-net 713, tracking node 703 may hand-off tracking to tracking node 715. The hand-off procedure may be triggered in response to network gateway 711 receiving a request from target node 709 to access network resources in sub-net 713. The hand-off procedure may be triggered by tracking node 703 detecting that target node 709 is moving toward an edge of sub-net 705.

Motion of target node 709 may be detected based on detecting a shift in transmission activity associated with nodes that receive/transmit message to/from target node 709. A shift in transmission activity may be an increase in transmission activity of messages from/to target node 709. A shift in transmission activity may be a decrease in transmission activity of messages from/to target node 709.

Movement of target node 709 may be detected based on a level of activity of nodes at or near a border of sub-net 705 and sub-net 713. For example, as target node 709 gets closer to an edge of sub-net 705 or 713, nodes close to the edges of these sub-nets may carry increased loads of network traffic that originates from, or is destined for, target node 709. Network traffic carried by nodes part of network 701 may be monitored by other nodes such as network gateways 707 and 711.

In some embodiments, target node 709 may only be allowed to access sub-net 713 if a tracking node on sub-net 713 is available to monitor activity of target node 709. Network gateway 711 may determine whether a tracking node is available on sub-net 713.

Thus, apparatus and methods for a smart IoT relay monitors are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for securing an Internet-of-things ("IoT") network of unsecured nodes, the system comprising:
   a network comprising a plurality of interconnected nodes;
   a target node under electronic surveillance, wherein electronic surveillance includes monitoring activity of the target node on the network due to the target node exhibiting a malicious activity pattern;
   a first tracking node that monitors machine-to-machine ("M2M") communications transmitted by the target node starting at a time the target node joins the network until the target node crosses a first checkpoint associated with the network, wherein the first checkpoint is defined by time, geographic location, message type, or threshold quantity of transmitted data; and
   a second tracking node that monitors the M2M communications transmitted by the target node after the target node crosses the first checkpoint; wherein:
   the first tracking node requests that any node that receives a message originating from the target node starting at the time the target node joins the network until the target node crosses the first checkpoint, relay a copy of the message to the first tracking node;
   the second tracking node requests that any node that receives a message originating from the target node after the target node crosses the first checkpoint, relay a copy of the message to the second tracking node;
   when the target node is within a pre-determined distance of the first checkpoint, the first tracking node hands-off electronic surveillance of the target node to the second tracking node; and
   in response to the first or second tracking node detecting malicious activity exhibited by the target node corresponding to M2M communications transmitted by the target node issuing instructions to a threshold number of unsecured nodes on the network to act in concert within a pre-determined time window, revoking electronic transmission privileges to and from the target node via predefined communication pathways on the network.

2. The system of claim 1 wherein the first and second tracking nodes monitor the M2M communications transmitted by the target node without the target node detecting that the first and second tracking nodes are monitoring the M2M communications.

3. The system of claim 1, wherein the first and second tracking nodes monitor the M2M communications transmitted by the target node by monitoring an average number of nodes on the network that retransmit the M2M communications transmitted by the target node until the M2M communications reach an intended destination node.

4. The system of claim 1, wherein the first and second tracking nodes monitor the M2M communications transmitted by the target node by following the M2M communications transmitted by the target node until the M2M communications reach a final destination node.

5. The system of claim 1 wherein:
the first tracking node receives electronic acknowledgment from any node on the network that:
is associated with a first sub-set of network addresses; and
receives M2M communications transmitted by the target node; and
the second tracking node receives electronic acknowledgment from any node on the network that:
is associated with a second sub-set of network addresses; and
receives M2M communications transmitted by the target node.

6. The system of claim 1 further comprising a network gateway and, when the target node joins the network, the network gateway commissions the first and second tracking nodes as destination network addresses for M2M communications transmitted by the target node.

7. The system of claim 1 further comprising a third tracking node, wherein:
the first tracking node commissions the second tracking node; and
the second tracking node commissions the third tracking node to monitor the M2M communications transmitted by the target node after the target nodes crosses a second checkpoint associated with the network.

8. The system of claim 1 wherein the target node is a first target node, the system further comprising a third tracking node, wherein:
the first tracking node designates a second target node based on a threshold level of M2M communication data transmitted by the first target node to the second target node; and
the first tracking node commissions the third tracking node to monitor the M2M communications transmitted by the second target node.

9. The system of claim 8, further comprising a fourth tracking node, wherein:
the third tracking node monitors the M2M communications of the second target node until the second target node reaches the first checkpoint; and
the fourth tracking node monitors the M2M communications of the second target node after it crosses the first checkpoint.

10. A method for securing nodes on an Internet-of-things ("IoT") network, wherein each node does not have sufficient hardware resources to implement a security protocol, the method comprising:
receiving, at a network gateway, a request from a target node to join the IoT network;
in response to receiving the request, the network gateway;
assigns the target node a compound network address that comprises:
an identifier of the target node on the IoT network; and
an identifier of a tracking node on the IoT network; and
propagates the compound network address to the nodes on the IoT network;
in response to receiving the compound network address, the nodes on the IoT network that relay messages transmitted by the target node copy the tracking node on all machine-to-machine ("M2M") communications transmitted by the target node;
in response to receiving the compound network address, the tracking node begins monitoring the M2M communications transmitted by the target node on the network; and
in response to the tracking node detecting a malicious activity pattern corresponding to M2M communications transmitted by the target node instructing a threshold number of nodes on the network to act in concert, revoking transmission privileges to and from the target node via predefined communication pathways on the network.

11. The method of claim 10 wherein the request is a first request transmitted to the target node at a first time and the network gateway is a first network gateway, the method further comprising:
receiving, at a second network gateway at a second time, a request from the target node to renew the compound network address;
in response to receiving the renew request from the target node, the second network gateway:
assigns the target node an updated compound network address that comprises:
an updated identifier for the target node; and
an identifier of a second tracking node on the network; and
propagates the updated compound network address to the nodes on the IoT network;
wherein in response to receiving the updated compound network address:
the first tracking node hands-off monitoring of the target node to the second tracking node;
the nodes on the IoT network that relay messages transmitted by the target node are configured to copy the second tracking node on all machine-to-machine ("M2M") communications transmitted by the target node; and
the second tracking node begins monitoring M2M communications transmitted by the target node.

12. The method of claim 11 wherein, handing-off monitoring of the target node comprises the first tracking node updating the second tracking node on a status of M2M communications transmitted by the target node and received by the first tracking node.

13. The method of claim 11 further comprising the second tracking node handing-back responsibility for monitoring the target node to the first tracking node.

14. The method of claim 10 wherein the tracking node is a first tracking node, the method further comprising, at the first tracking node:

detecting a request by the target node to renew the compound network address; and in response to detecting the renew request, commissioning a second tracking node to monitor the M2M communications of the target node; wherein after the first tracking node commissions the second tracking node, the first and second tracking nodes jointly monitor the M2M communications of the target node.

15. The method of claim 10 further comprising, in response to detecting M2M communications transmitted by the target node that correspond to instructions, issued by the target node, to a threshold number of nodes on the network to act in concert, intercepting the M2M communications and spoofing the target node with confirmation that the M2M communications transmitted by the target node have been successfully transmitted to the threshold number of nodes.

16. A system for securing an Internet-of-things ("IoT") network comprising unsecured nodes, the system comprising:
- a network comprising a plurality of interconnected nodes and a target node under electronic surveillance, wherein electronic surveillance includes monitoring activity of the target node on the network due to the target node exhibiting a malicious activity pattern;
- a first tracking node that:
- monitors machine-to-machine ("M2M") communications transmitted by the target node when the target node is within a first geographic region; and
- requests that any node within the first geographic region that receives a message originating from the target node relay a copy of the message to the first tracking node; and
- a second tracking node that:
- monitors M2M communications transmitted by the target node after the target node exits the first geographic region and enters a second geographic region; and
- requests that any node within the second geographic region that receives a message originating from the target node relay a copy of the message to the second tracking node;

wherein:
when the target node is within a pre-determined distance of the second geographic region, the first tracking node is configured to hand-off electronic surveillance of the target node to the second tracking node; and in response to the first or second tracking nodes detecting a malicious activity pattern exhibited by the target node corresponding to M2M communications transmitted by the target node issuing instructions to a threshold number of unsecured nodes on the network to act in concert, configuring the threshold number of nodes to spoof the target node with confirmation that messages transmitted by the target node have been successfully transmitted to an intended destination.

17. The system of claim 16, in response to the first or second tracking nodes detecting M2M communications transmitted by the target node that correspond to the target node issuing instructions to the threshold number of unsecured nodes on the network to act in concert, the first or second tracking nodes are configured to suspend an ability of the target node to transmit electronic M2M communications on the network.

18. The system of claim 16, in response to the first or second tracking nodes detecting M2M communications transmitted by the target node that correspond to the target node issuing instructions to the threshold number of unsecured nodes on the network to act in concert, the first or second tracking nodes are configured to assign a third tracking node to monitor the M2M communications transmitted by the target node in the first geographic region and in the second geographic region.

19. The system of claim 16, wherein the instructions to the threshold number of nodes on the network to act in concert correspond to a distributed denial of service attack on the IoT network.

* * * * *